(12) United States Patent
Evans et al.

(10) Patent No.: US 8,646,552 B2
(45) Date of Patent: Feb. 11, 2014

(54) INTEGRATED ENERGY ABSORBER AND AIR FLOW MANAGEMENT STRUCTURE

(75) Inventors: Darin Evans, Spring Lake, MI (US); Dan Ralston, Walker, MI (US); Benjamin R. Zabik, Ann Arbor, MI (US)

(73) Assignee: Shape Corp., Grand Haven, MI (US)

( * ) Notice: Subject to any disclaimer, the term of this patent is extended or adjusted under 35 U.S.C. 154(b) by 105 days.

(21) Appl. No.: 13/186,949

(22) Filed: Jul. 20, 2011

(65) Prior Publication Data

US 2012/0019025 A1  Jan. 26, 2012

Related U.S. Application Data

(60) Provisional application No. 61/366,325, filed on Jul. 21, 2010.

(51) Int. Cl.
*B60K 11/08* (2006.01)

(52) U.S. Cl.
USPC ........................................................ 180/68.1

(58) Field of Classification Search
USPC ......................................... 180/68.1; 123/120
See application file for complete search history.

(56) References Cited

U.S. PATENT DOCUMENTS

| | | | |
|---|---|---|---|
| 3,926,463 A * | 12/1975 | Landwehr et al. | 293/136 |
| 4,410,032 A * | 10/1983 | Mori | 165/44 |
| 4,539,944 A | 9/1985 | Garcea et al. | |
| 4,619,073 A | 10/1986 | Janthur et al. | |
| 4,779,577 A | 10/1988 | Ritter et al. | |
| 5,141,026 A | 8/1992 | Collette | |
| 5,566,745 A | 10/1996 | Hill et al. | |
| 5,569,076 A | 10/1996 | Sudak et al. | |
| 6,145,251 A * | 11/2000 | Ricci | 49/82.1 |
| 6,406,081 B1 * | 6/2002 | Mahfet et al. | 293/133 |
| 6,854,544 B2 * | 2/2005 | Vide | 180/68.6 |
| 7,131,674 B2 * | 11/2006 | Evans et al. | 293/120 |
| 7,222,897 B2 * | 5/2007 | Evans et al. | 293/120 |
| 7,387,079 B2 | 6/2008 | Kruse | |
| 7,494,165 B2 * | 2/2009 | Evans et al. | 293/102 |
| 7,498,926 B2 | 3/2009 | Browne et al. | |
| 7,503,620 B2 * | 3/2009 | Brennecke et al. | 296/187.02 |
| 7,530,623 B2 * | 5/2009 | Hampel | 296/146.11 |
| 7,644,793 B2 | 1/2010 | Iwasaki et al. | |

(Continued)

FOREIGN PATENT DOCUMENTS

| | | |
|---|---|---|
| CN | 2424399 | 3/2001 |
| CN | 2761456 | 3/2006 |

(Continued)

*Primary Examiner* — Jeffrey J Restifo
*Assistant Examiner* — Erez Gurari
(74) *Attorney, Agent, or Firm* — Price Heneveld LLP

(57) ABSTRACT

An integrated assembly includes a bumper energy absorber section with crush lobes for abutting a bumper beam, an upper air shutter section with subassembled shutter members movable between closed and open positions, a first actuator mechanism for moving the shutter members between positions, an upper fascia support section with upper leg crush lobe therein above the upper air shutter section, a lower air shutter section with subassembled lower shutter members movable between closed and open positions, a second actuator mechanism for moving the lower shutter members between the positions; and a lower leg energy absorber section attached below the lower air shutter section and configured to abut (or replace) a face of a secondary pedestrian impact bar. The shutter members may be molded to a shutter frame using over molding technology rather than separately, manually assembled.

12 Claims, 11 Drawing Sheets

(56) References Cited

U.S. PATENT DOCUMENTS

| | | | |
|---|---|---|---|
| 7,717,208 B2 | 5/2010 | Knauer | |
| 7,766,111 B2* | 8/2010 | Guilfoyle et al. | 180/68.1 |
| 7,784,576 B2* | 8/2010 | Guilfoyle et al. | 180/68.1 |
| 7,806,448 B2* | 10/2010 | Allen et al. | 293/120 |
| 8,056,946 B2* | 11/2011 | Bernt et al. | 293/102 |
| 8,091,668 B2* | 1/2012 | Amano et al. | 180/68.1 |
| 8,128,153 B2* | 3/2012 | Bernt et al. | 296/187.04 |
| 8,161,919 B2* | 4/2012 | Klotz et al. | 123/41.04 |
| 8,181,727 B2* | 5/2012 | Ritz et al. | 180/68.1 |
| 8,196,979 B2* | 6/2012 | Ralston et al. | 293/121 |
| 8,292,014 B2* | 10/2012 | Sugiyama | 180/68.1 |
| 8,316,974 B2* | 11/2012 | Coel et al. | 180/68.1 |
| 2001/0035658 A1 | 11/2001 | Anderson et al. | |
| 2002/0005644 A1* | 1/2002 | Tamada et al. | 293/120 |
| 2003/0029581 A1* | 2/2003 | Vide | 160/201 |
| 2006/0095178 A1* | 5/2006 | Guilfoyle et al. | 701/36 |
| 2007/0182171 A1* | 8/2007 | Kageyama et al. | 293/102 |
| 2009/0039674 A1* | 2/2009 | Hassdenteufel et al. | 296/180.1 |
| 2010/0071977 A1* | 3/2010 | Ritz et al. | 180/68.1 |
| 2010/0083917 A1 | 4/2010 | Saida et al. | |
| 2010/0109354 A1* | 5/2010 | Agrahari et al. | 293/120 |
| 2010/0147611 A1* | 6/2010 | Amano et al. | 180/68.1 |
| 2010/0243351 A1* | 9/2010 | Sakai | 180/68.1 |
| 2010/0243352 A1* | 9/2010 | Watanabe et al. | 180/68.1 |
| 2010/0282533 A1* | 11/2010 | Sugiyama | 180/68.1 |
| 2011/0001325 A1* | 1/2011 | Bernt et al. | 293/155 |
| 2011/0097984 A1* | 4/2011 | Hasegawa et al. | 454/152 |
| 2011/0181062 A1* | 7/2011 | Bernt et al. | 293/102 |
| 2011/0226541 A1* | 9/2011 | Hori et al. | 180/68.1 |
| 2012/0012410 A1* | 1/2012 | Hori | 180/68.1 |
| 2012/0019025 A1* | 1/2012 | Evans et al. | 296/193.1 |
| 2012/0067655 A1* | 3/2012 | Charnesky et al. | 180/68.1 |
| 2012/0097464 A1* | 4/2012 | Waugh | 180/68.1 |
| 2012/0111652 A1* | 5/2012 | Charnesky et al. | 180/68.1 |
| 2012/0132474 A1* | 5/2012 | Charnesky et al. | 180/68.1 |
| 2012/0312611 A1* | 12/2012 | Van Buren et al. | 180/68.1 |

FOREIGN PATENT DOCUMENTS

| | | |
|---|---|---|
| CN | 201276011 | 7/2009 |
| EP | 1074419 | 2/2001 |
| JP | 05-016676 | 1/1993 |
| JP | 2522260 | 10/1996 |
| JP | 2000130167 | 5/2000 |
| JP | 2004276712 | 10/2004 |
| JP | 2006218975 | 8/2006 |
| JP | 2007001503 | 1/2007 |
| JP | 2007008190 | 1/2007 |
| JP | 2007320527 | 12/2007 |
| JP | 2008106982 | 5/2008 |
| JP | 2008260447 | 10/2008 |
| KR | 20020035247 | 5/2002 |
| WO | 2005012043 | 2/2005 |

* cited by examiner

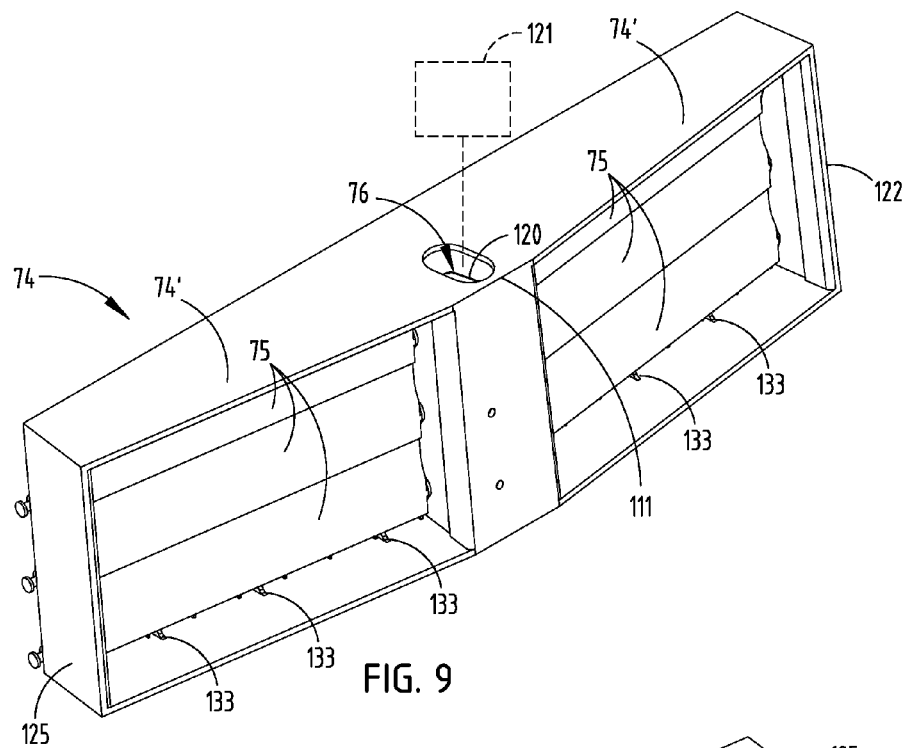
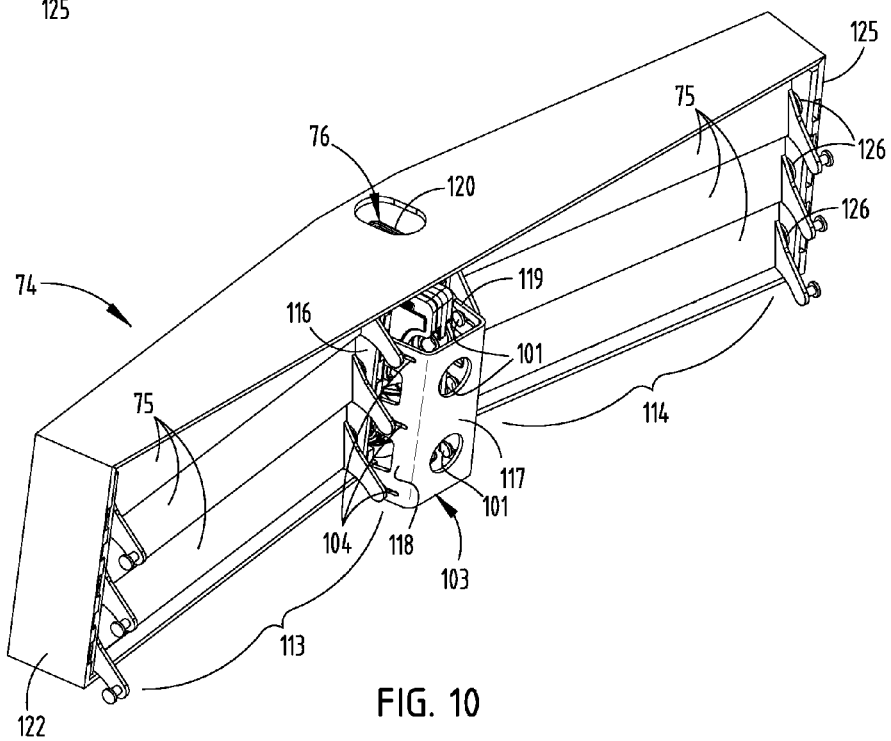

INTEGRATED ENERGY ABSORBER AND AIR FLOW MANAGEMENT STRUCTURE

This application claims benefit under 35 USC §119(e) of provisional application Serial No. 61/366,325, filed Jul. 21, 2010, entitled INTEGRATED ENERGY ABSORBER AND AIR FLOW MANAGEMENT STRUCTURE, the entire contents of which are incorporated herein by reference.

BACKGROUND

The present invention relates to vehicle front end components for energy absorption and air flow, and more particularly relates to an energy absorber with integrated air flow management structure incorporated therein, such as shutters and a shutter control mechanism.

In modern passenger vehicles, control of air flow in and around the vehicle's engine is important to engine performance and overall operation. Baffles and air dams are often used, but they usually are fixed and hence limited in their ability to deal with various engine conditions (such as engine temperature at engine start up and continuing operation) and various environmental conditions (such as high or low outside temperatures). Some apparatus are known for actively controlling air flow. However, as best understood, none of the known systems are adapted to work upon failure of its opening mechanism or upon decoupling of shutters from the respective opening mechanism.

There are also additional concerns outside of air control. For example, there is limited space in front of a vehicle engine and around a vehicle's bumper system, and the presence of any air flow control mechanism and control structure can require significant space (sometimes called "real estate") not available at the vehicle front without adversely/greatly affecting the vehicle's appearance and aerodynamics. Further, vehicle assembly should preferably not be complicated nor made more complex by the need to assembly additional parts and pieces together or to the vehicle. Still further, any system should be durable, robust, and have low warranty, and also should permit operation of the vehicle even in the event of failure of the air flow control mechanism.

Vehicle bumper systems continue to be important to vehicle passenger and pedestrian safety. Many known bumper systems include energy absorbers made of polymeric materials. However no known system integrates a bumper energy absorber for management of impact energy into an air management system for active control of air flow. Further, it is counter-intuitive to make any such combination due to the totally different functions of such parts, due to the different polymeric materials which are used to make them, due to their relatively different positions on a vehicle, and due to the fact that shutter systems include multiple movable subcomponents while a bumper energy absorber is a single component with non-moving parts.

SUMMARY OF THE PRESENT INVENTION

In one aspect of the present invention, an assembly is provided for a vehicle including a bumper reinforcement beam. The assembly includes a component having an energy absorbing section and a shutter section. The energy absorbing section includes at least one crush section configured to absorb energy when crushed against the bumper reinforcement beam. The shutter section includes active shutter members movable between a closed position to block air flow through the shutter section, an open position to allow air flow through the shutter section, and at least one partially-open position there between for allowing limited air flow.

In another aspect of the present invention, an assembly is provided for a vehicle including a power plant. The assembly includes a component including a perimeter frame defining an opening and a shutter module that fits matably into the opening and is attached to the perimeter frame. The shutter module includes active shutter members movable between a closed position to block air flow through the shutter perimeter frame. An open position allows air flow through the perimeter frame and at least one partially-open position there between for allowing limited air flow.

In another aspect of the present invention, a vehicle comprises a vehicle frame, a bumper reinforcement beam on a front of the vehicle frame, and a power plant supported on the vehicle frame and located behind the reinforcement beam. A vehicle comprises a component including a shutter section positioned above the reinforcement beam and at least as far forward as a rear surface of the reinforcement beam, the shutter section including active shutter members movable between a closed position to block air flow through the shutter perimeter frame, an open position to allow air flow through the perimeter frame, and at least one partially-open position there between for allowing limited air flow.

In another aspect of the present invention, an assembly for a vehicle includes a power plant. The assembly comprises a shutter assembly positioned to control air flow toward the engine, and including shutter vane members movable to different air flow positions to selectively control air flow through the shutter section, at least one of the shutter vane members having a cross section with two spaced arms and a stem defining a "Y" shape and further having stiffening ribs extending between the spaced arms for vane stiffness, a tip of one of the arms having a first surface shaped to closely engage a mating surface on the stem to minimize air leakage when the first and mating surfaces engage. At least one linkage arm and linkage for selectively moving the shutter vane members between the different air flow positions.

In another aspect of the present invention, an integrated assembly for a vehicle comprises a unitary molding including a bumper energy absorber section with a plurality of crush lobes configured to abut a face of a primary bumper reinforcement beam, and at least one shutter section with shutter members configured to move between an air-blocking closed position and an air-flow open position. The assembly further includes an actuator mechanism for moving the shutter members between the closed and open positions.

These and other aspects, objects, and features of the present invention will be understood and appreciated by those skilled in the art upon studying the following specification, claims, and appended drawings.

BRIEF DESCRIPTION OF DRAWINGS

FIGS. 9-10 are perspective front and rear views of a modified component incorporating a snap-in air shutter system.

DETAILED DESCRIPTION OF PREFERRED EMBODIMENTS

Figure 1:
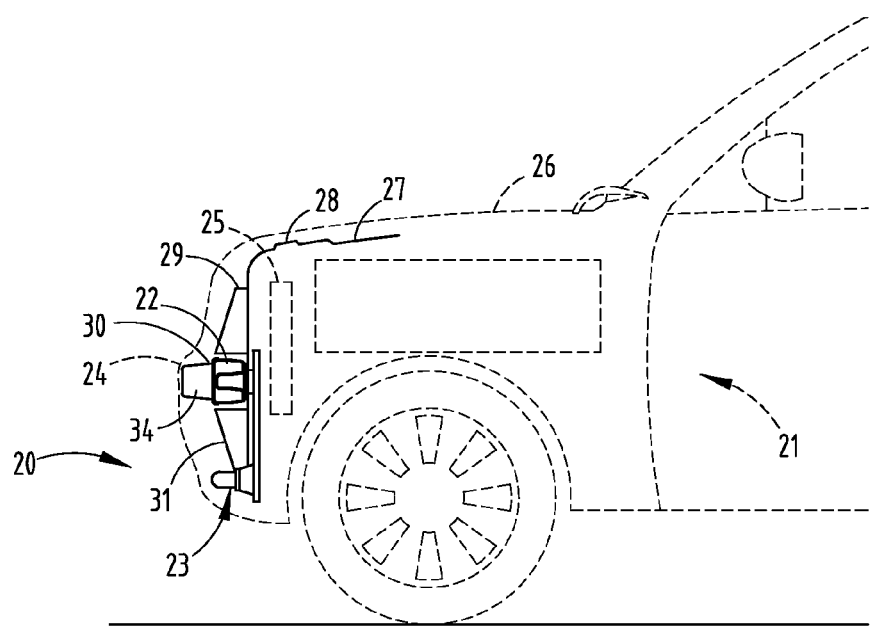
FIG. 1 is a side view of a vehicle with an integrated assembly embodying the present innovation.
Figure 2:
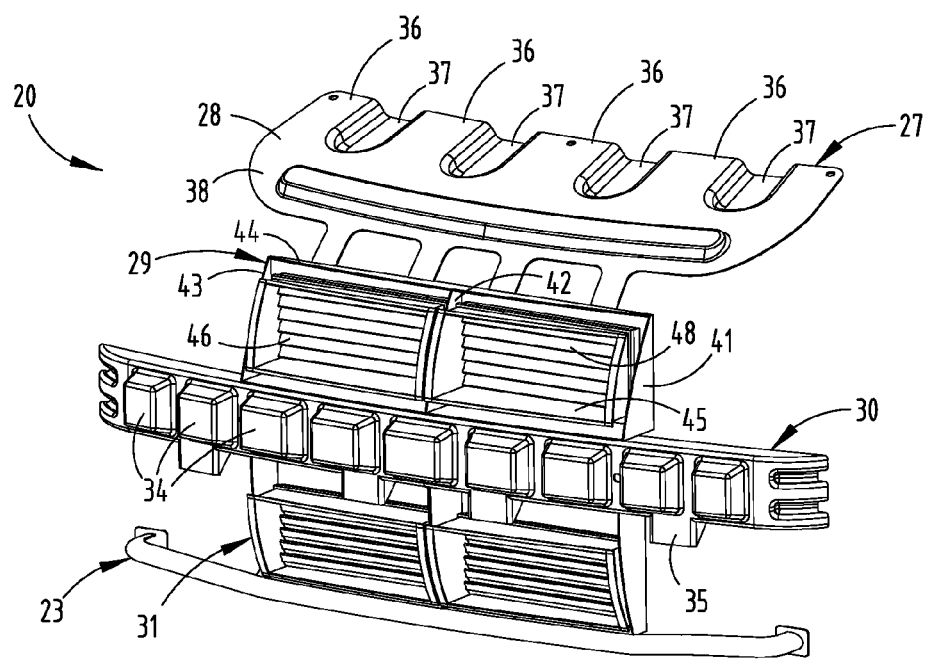
FIG. 2 is a perspective view of the integrated assembly of FIG. 1.

The present integrated assembly 20 (FIGS. 1-2) is configured for assembly to a vehicle 21 having a bumper reinforcement beam 22, a pedestrian impact bar 23, a fascia 24, a radiator 25, and a hood 26. The integrated assembly 20 includes an upper fascia support section 27, an upper leg energy absorber section 28, an upper air shutter section 29, a bumper energy absorber/lower fascia support section 30, and a lower air shutter section 31. A polymeric lower leg energy absorber section can be positioned on a front of the pedestrian impact bar 23 if desired. Upon assembly, the bumper energy absorber section 30 is position on a face of the bumper reinforcement beam 22.

The bumper energy absorber section 30 mates against a front of the beam 22 and includes crush lobes 34 configured to absorb substantial energy upon impact against an object according to a desired force/deflection curve. The bumper energy absorber section 30 also includes multiple triangular-shaped downward-extending protrusions 35 on right and left sides for acting as pendulum impact catchers, which facilitate passing a pendulum impact testing required by federal and insurance bumper standards/tests.

The pedestrian impact bar 23 is positioned to engage a pedestrian's leg in a manner reducing injury by engaging a lower portion of the pedestrian's leg. The impact bar 23 has an impact strength less than the primary bumper reinforcement beam 22, but that is sufficient for its intended purpose. As noted above, an energy absorber section and/or fascia could be positioned on a front of the pedestrian impact bar 23 if desired.

The upper fascia support section 27 rests on a vehicle's bulkhead and includes raised portions 36 and lower portions 37, thus forming an undulating surface that supports fascia 24 at a desired distance above the bulkhead.

The upper leg energy absorber section 28 includes at least one protruding crush lobe 38 positioned to engage a pedestrian's upper leg during a pedestrian impact, thus softening an initial impact against the pedestrian.

The sections 27-32 are molded of a polymeric material as a single molding, such as a structural polymer adapted for absorbing energy upon receiving a crushing impact. Such polymers are commercially available from several companies, including NetShape, a division of Shape Corporation in Grand Haven, Mich. It is contemplated that the sections 27-32 could be molded as two or more separate moldings and assembled together.

The shutter sections 29 and 31 each include molded frame bodies forming right and left "window" openings for air flow. For convenience, only the upper shutter section 29 is described below, but it is to be understood that the sections 29 and 31 include an actuating mechanism that operates them simultaneously or individually depending on vehicle function and control requirements. The shutter sections 29 and 31 control air flow into the power plant compartment of the vehicle (i.e. the engine compartment, or in some vehicle, a motor and/or generator and/or power generating unit). Control of the shutter sections 29 and 31 is by the engine control system, and is intended to optimize operation of the vehicle's power plant.

Figure 3:
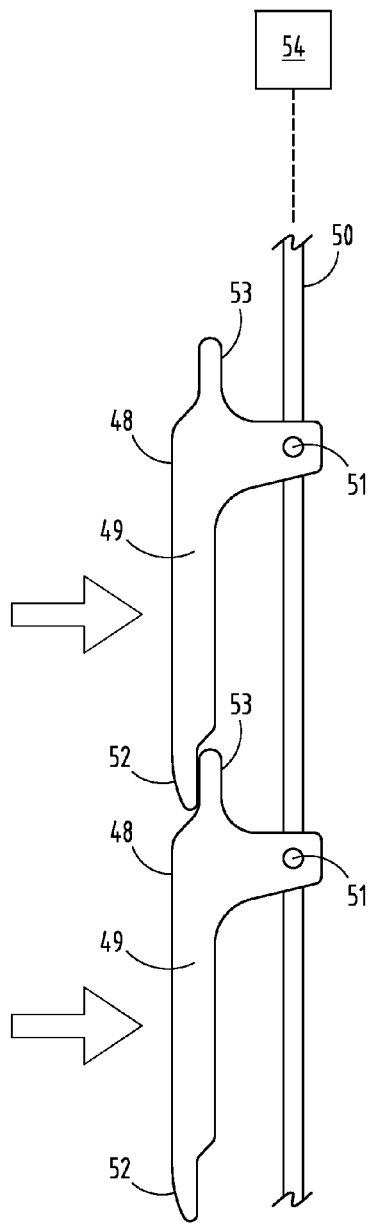
FIGS. 3-4 are enlarged side views of two adjacent shutters and an actuator mechanism for operating the shutters, FIG. 3 showing the shutters closed, FIG. 4 showing the shutters open.
Figure 4:
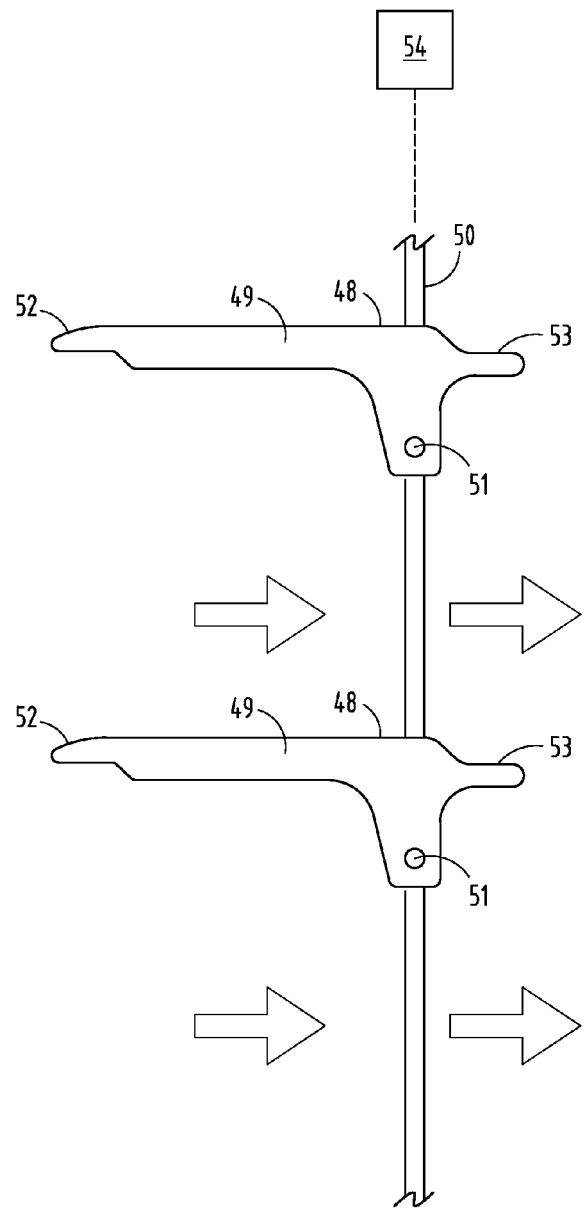

Shutter section 29 includes a molded frame body comprising three vertical structural frame members 41-43 and upper and lower horizontal structural frame members 44-45 interconnected to form window openings 46-47. A plurality of horizontal shutter members 48 are positioned in the openings 46, 47, and are pivoted at each end at pivot locations (FIGS. 3-4) for movement between an open air-passing position (FIG. 4) and a closed air-blocking position (FIG. 3). A vertical linkage 50 (FIGS. 3-4) is attached to the shutter members 48 at location 51 which is spaced from other pivot location, so that by pulling the linkage 50 vertically, the shutter members 48 are selectively simultaneously opened (FIG. 4) or closed (FIG. 3). One end 52 of the shutter member 48 includes a thinned finger, and the other end 53 includes a concavity for matably engaging the thinned finger when in the closed position (FIG. 3). An actuator mechanism includes the vertical linkage 50 and further includes an actuator 54 for lifting the linkage 50 vertically and for releasing the linkage 50 to drop by a spring bias and/or by gravity or power-down movement. The actuator 54 can be any of a variety of different extendable devices, such as electrical, air, hydraulic, or other.

The shutter members 48 are aerodynamically designed so that if the actuator 54 or linkage 50 becomes decoupled from the shutter members 48, or if the actuator 54 become non-functional for some reason, the air flow (from a moving vehicle) will tend to support the shutter members 48 in an open position due to their aerodynamic design.

The present assembly 20 serves to provide, in a single component installable on a vehicle, both energy absorption and air inlet management at the front end of a motor vehicle. The structure can be composed of varying levels of part integration and serve one or all functions related to front end energy and air inlet management. The energy management functions include those required for "low speed" impacts (<10 mph), high speed impacts (>10 mph), and pedestrian related impacts. Various embodiments may include some or all of these functions. The illustrated shutter system includes features which provide for a default shutter-open state in the event of mechanical failure of the shutter control mechanism, thus preventing overheating of the engine due to the shutters being disabled in a closed state. This shutter-open state is provided by the aerodynamic design of the shutter.

Modification

An integrated assembly 70 (FIGS. 5-8) includes a bumper energy absorber section 71 with crush lobes 72 for abutting a primary bumper reinforcement beam 73, an upper air shutter section 74 with subassembled upper shutter members 75 (also called "vanes") movable between closed and open positions, a first actuator mechanism 76 for moving the upper shutter members 75 between positions, an upper fascia support section 77 with upper leg crush lobe 78 therein above the upper air shutter section 74 for pedestrian upper leg impact, a lower air shutter section 79 with subassembled lower shutter members 80 movable between closed and open positions, a second actuator mechanism 81 (or alternatively a link to actuator mechanism 76) for moving the lower shutter members 80 between the positions; and a lower leg energy absorber section 82 (also called a "lower fascia stiffener") attached below the lower air shutter section 79 and configured to abut (or replace) a face of a secondary pedestrian impact bar (or to be sufficiently strong to replace same as a fascia stiffener). It is contemplated that the upper and lower shutter sections 74 and 79 include integrally molded window frames 74' and 79' that support the upper and lower shutter members 75 and 80 for movement, as discussed below. Notably, the shutter members 75 and 80 can be manually or automatically assembled to the frames 74' and 79', as discussed below. The shutter sections 74 and 79 control air flow into the power plant compartment of the vehicle (i.e. the engine compartment, or in some vehicle, a motor and/or generator and/or power generating unit). Control of the shutter sections 74 and 79 is by the engine control system, and is intended to optimize operation of the vehicle's power plant.

It is contemplated that the present shutter members 75 (and/or 80) may be molded to a shutter frame using over molding technology rather than separately assembled in a secondary manual assembly operation. For example, in one type of over-molding technology, first and second die halves are brought together and the shutter members 75 are molded in a first cavity formed therebetween. Then, the first die half is removed, leaving the shutter members 75 in the remaining second die half. A third die half is then mated against the second die half to form a second cavity that extends around portions of the first cavity. Molten polymeric material (i.e., a different plastic than the material of shutter members 75, and that will not adhere to it) is injected into the second cavity to form the shutter frame. As molded, the shutter members 75 are attached to the shutter frame 74' without the need for secondary assembly, including an ability of the shutter members 75 to pivot on the shutter frame. There is additional discussion on this below.

The illustrated bumper energy absorber section 71 with spaced-apart hollow crush lobes 72 is designed to abut a face of a primary bumper reinforcement beam, such as the B-shaped beam 73 with beam face 85. It is preferably injection molded, but can be made by other polymer forming means if desired. The crush lobes 72 each include front, top, bottom, and opposing sides walls designed to crush and collapse with optimal energy-absorbing profile (i.e. impact force versus stroke) upon impact. The various walls of the crush lobes 72 can include stiffening ribs and/or crush-initiating apertures to facilitate tuning of the crush boxes. The illustrated bumper energy absorber section 71 is an integral part of a larger component, as described below, but it is noted that it could be molded separately and attached in a secondary operation.

The upper air shutter section 74 includes a shutter window frame 74' with upper shutter members 75 mounted thereon and movable between closed and open positions. The illustrated shutter window frame 74' is molded with the bumper energy absorber section 71 as a single integral molding. It includes opposing side walls 87 and 88 and top and bottom walls 89 and 90 that form "window" frames into which the shutter members 75 fit, with ends of the shutter members 75 having outwardly-extending protrusions 99 that form axles rotationally mounted in the side walls 87 and 88. The illustrated shutter frame 74' includes right and left side portions 91 and 92, each being a mirror image of the other and being positioned on opposite sides of a center portion 93.

Figure 14:
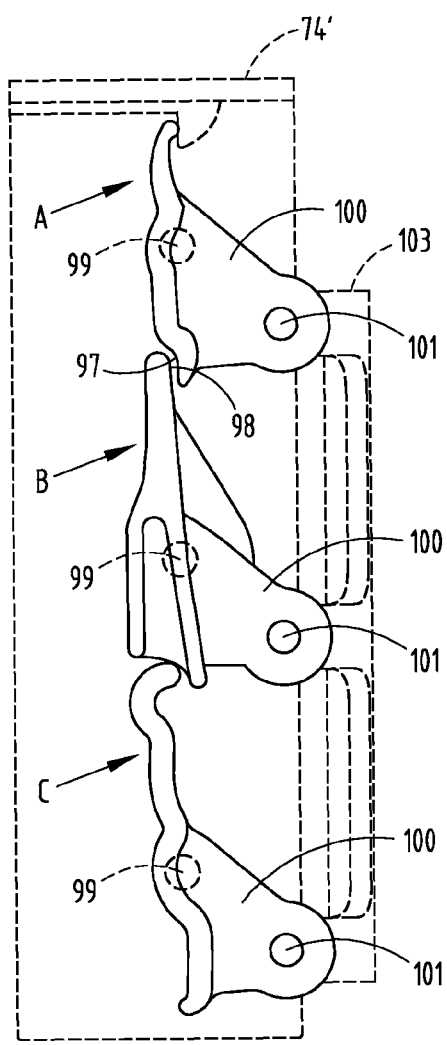
FIG. 14 is an enlarged cross sectional view like FIG. 13, but with the shutter frame dashed out to better show a position of the shutter members and shutter actuation mechanism.
Figure 15:
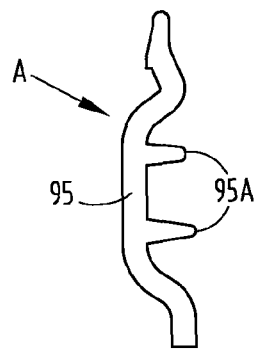
FIGS. 15-17 are cross-sectional views of the middle, top and bottom veins in FIG. 14.

The shutter members 75 are horizontally elongated (see FIGS. 11, 14-17) and shaped with ends configured to matingly positively engage with more than line contact (when in the closed position, see FIG. 14) to prevent unwanted air leakage. Specifically, the ends of the illustrated shutter members 75 include radiused overlapping edge surfaces (such as surfaces 97 and 98, FIG. 14) that generally match (i.e. more than line contact engagement). The shutter members 75 further include multiple arms 100 spaced along their length that extend rearward to a position spaced from the axle protrusions 99. The arms 100 each include a pivot hole location 101.

Figure 16:
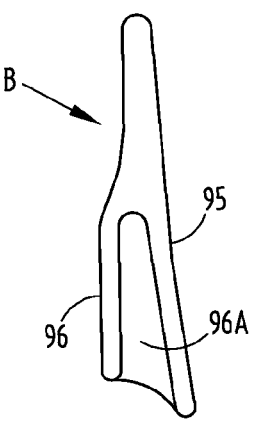
Figure 17:
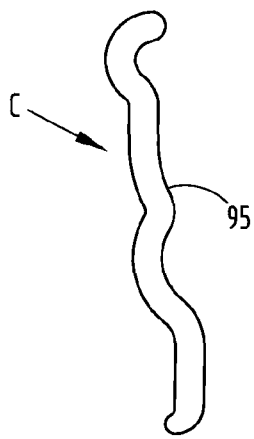
Figure 18:
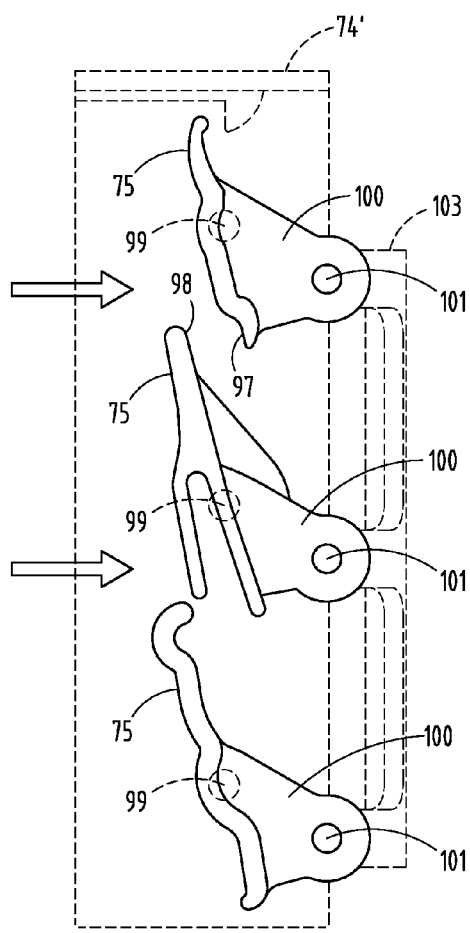
FIGS. 18-21 are cross-sectional views similar to FIG. 14 but showing the top, middle, and lower veins in a 10 degree open position, 15 degree open position, 45 degree open position, and fully opened position, respectively.
Figure 19:
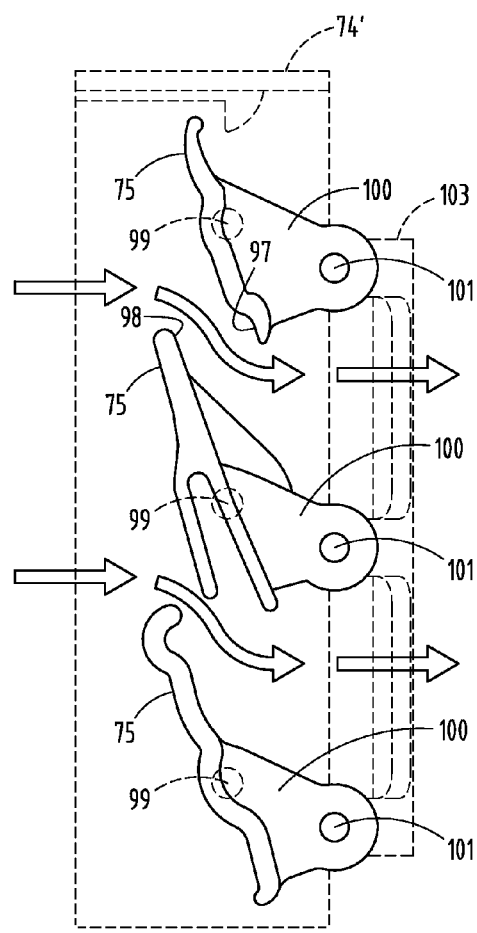
Figure 20:
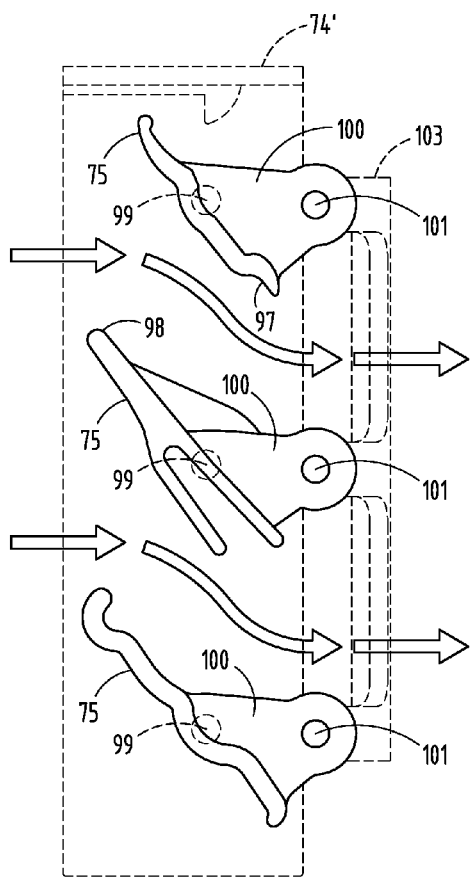
Figure 21:
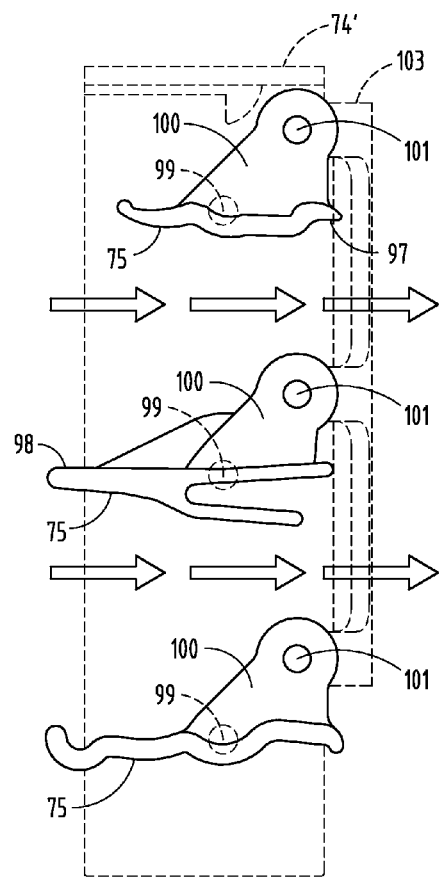

As noted above, the shutter members 75 can be molded in place on the frames 74' by using over-molding technology (rather than requiring a separate assembly). Notably, over-molding technology is presently used to make air deflector assemblies for modern passenger vehicles, where the assemblies are positioned in the air conditioning outlets in instrument panels, with adjustable deflector vanes being pivotally supported by deflector vane-mounting frames. As molded, the deflector vanes are pivotally supported, thus saving cost and assembly time. The shutter members 75 preferably have cross sectional shapes that stiffen them longitudinally, thus minimizing distortion due to forces that might cause the shutter members to twist. For example, the cross sections may have a serpentine non-linear primary wall 95 (see FIGS. 15-17) with undulations for strength (see FIGS. 15, 17), and/or external ribs 95A for strength (FIG. 15), and/or a parallel secondary wall 96 with transverse ribs 96A that connect the wall 96 to the primary wall 95 (FIG. 16).

The first actuator mechanism 76 (FIG. 11) includes a vertical link 103 with pivot holes 101 that rotatably engage/receive the pivot protrusions 104 ("axles") and attach the shutter members 75 to the link 103. (Alternatively, the protrusions 104 can be a separate rivet-like part, or can be a hole in the frame engaged by a protrusion on the shutter member.) An actuator 76 (or 81) is connected to a top of the link 103 (or connected at another location). The actuator 76 (or 81) can be any means desired, such as a reversible electric motor, or pneumatic motor, or a solenoid, or multi-position motivating device, such as devices known and presently used in the automotive industry for other things.

The upper fascia support section 77 (FIG. 6) includes the upper leg crush lobe 78 which extends horizontally and is located above the upper air shutter section 74 for pedestrian upper leg impact. Notably, the crush lobe 78 is illustrated as being a single lobe design, but it is contemplated that it can include multiple spaced-apart crush boxes, each being designed for specific energy absorption based on its location along a width of the vehicle. The upper fascia support section 77 also potentially includes a hood latch mount 108, and an undulating top wall section 109 designed both to support fascia above a bulkhead (under the support section 77) and designed with desired hood slam functionality and top-impact energy absorption (such as during a pedestrian's upper leg impacting the hood front).

The lower air shutter section 79 with subassembled lower shutter members 80 are movable between closed and open positions, substantially like the shutter section 74 described above. A person skilled in this art will understand the innovative specifics of the lower air shutter section 79, based on the discussion above of shutter section 74. Thus, the details of their shape, size, mounting, and manufacture need not be repeated.

Similarly, the second actuator mechanism 81 is designed, constructed, and assembled for moving the lower shutter members 80 between the positions, much like actuator mechanism 76.

The lower leg energy absorber section 82 (also called a "lower fascia stiffener") is attached below the lower air shutter section 79 and configured to abut (or replace) a face of a secondary pedestrian impact bar 83 (or replace same as a fascia stiffener).

It is contemplated that the upper and lower shutter sections 74 and 79 include window frames 74' and 79' integrally molded as a single contiguous part with the components 71, 72, 77, 78, 82. Notably, the shutter members 75 and 80 can be manually or automatically assembled to the frames 74' and 79', but alternatively may be molded to the respective shutter frames using over-molding technology (rather than requiring a separate secondary assembly).

Figure 11:
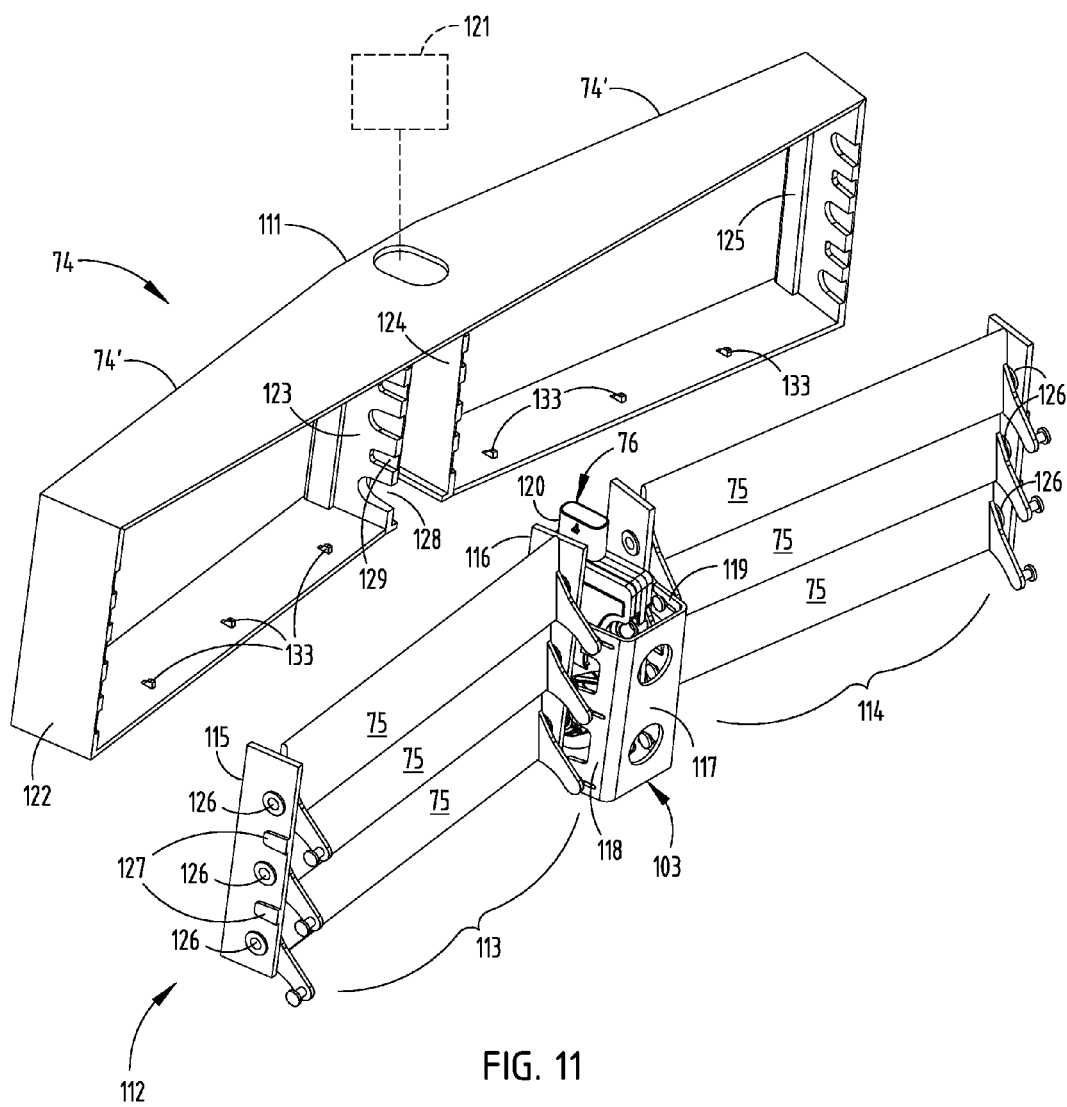
FIG. 11 is an exploded perspective view of FIG. 10.
Figure 12A:
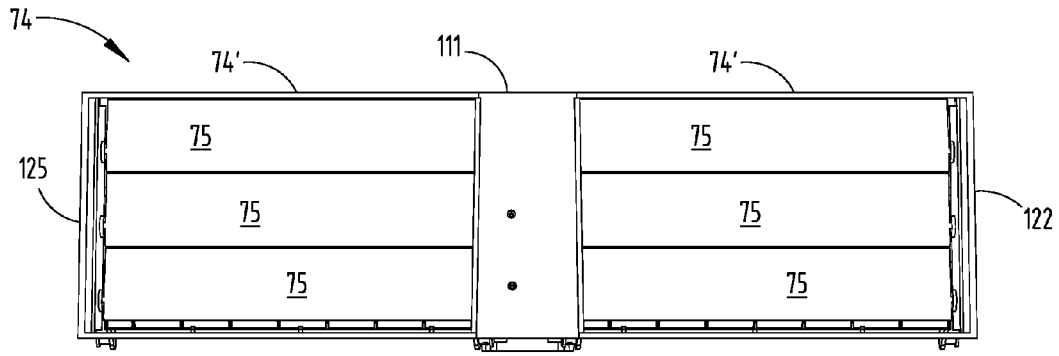
FIGS. 12 and 12A are front and rear views of FIG. 9.
Figure 12:
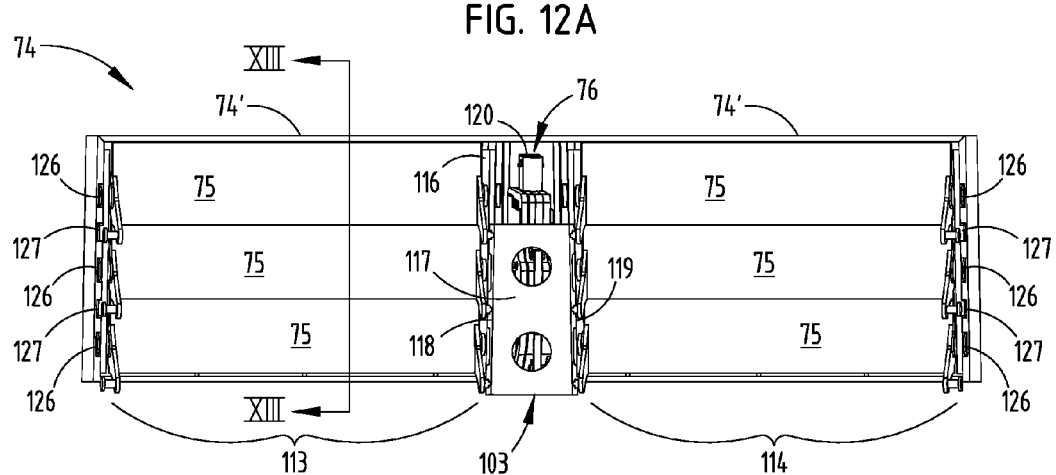
Figure 13:
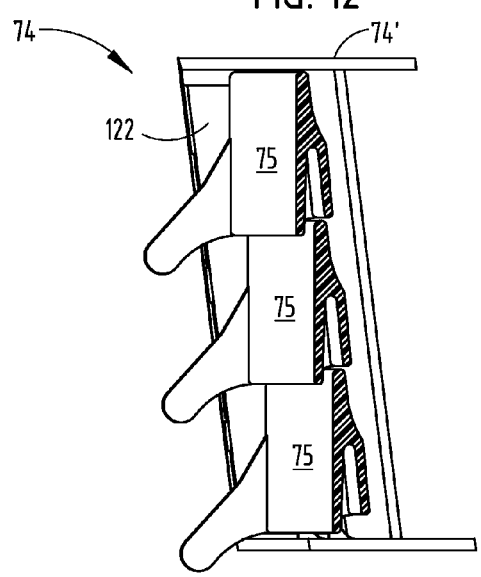
FIG. 13 is a cross sectional view taken along line XIII-XIII in FIG. 12.

FIGS. 9-11 illustrate that the shutter section(s) can be made to allow a shutter subassembly (with the vanes) to snap assemble to their respective shutter frames. Specifically, the shutter section 74 (FIG. 11) includes a pair of adjacent frames 74' held together by a center section 111. The shutter modules 112 are shaped to snap into the frames 74'. The module 112 can be a single part having right and left side portions, or can have a right subassembly 113 and a left subassembly 114 attached mechanically together. The illustrated right subassembly 113 includes right and left vertical subwalls 115 and 116, with shutter members 75 over-molded between the subwalls 115 and 116. Testing has shown that the illustrated right subassembly 113 can be handled as a unit, without the need for fixturing, though care must be taken when handling it depending on the stiffness of the individual parts. The illustrated center link 117 (see link 103) has a U-shaped horizontal cross section, with a left wall 118 of the cross section engaging the pivot protrusions 104 of the "right-side" shutter members 75, and a right wall 119 of the cross section engaging the pivot protrusions 104 of the "left-side" shutter members 75. A connector guide 120 maintains alignment of the actuator 121 when motivating/operating the link 117 via actuator 76. A spring bias (or other biasing means) can be used to bias the shutter members 75 to a desired location for initial engine startup. Also, gravity can be used to help bias the shutter members 75 to a desired position, along with natural forces of flowing air when the vehicle is moving.

The adjacent frames 74' form right and left opening to receive right and left subassembly 113, 114 formed in part by the vertical frame walls 122-125. The outer surface of the subwalls 115 and 116 includes pivot locations 126 and protruding guides/attachment hooks 127, and the vertical frame walls 122-125 include mating grooves 128 and 129 shaped to receive the pivot locations 126 and guides/hooks 127. They also include a plurality of mating features (such as a frictional ramp/hook and mating depression on mating surfaces of the features 127/129 that are configured for easy sliding engagement but relatively high retention strength) shaped to snappingly frictionally engage during assembly of the modules into the frames 74'. Stop protrusions 133 are provided such as shown on horizontal walls 134 of the frame 74' to limit rotation (i.e., prevent over-rotation) of the shutter members 75.

Figure 5:
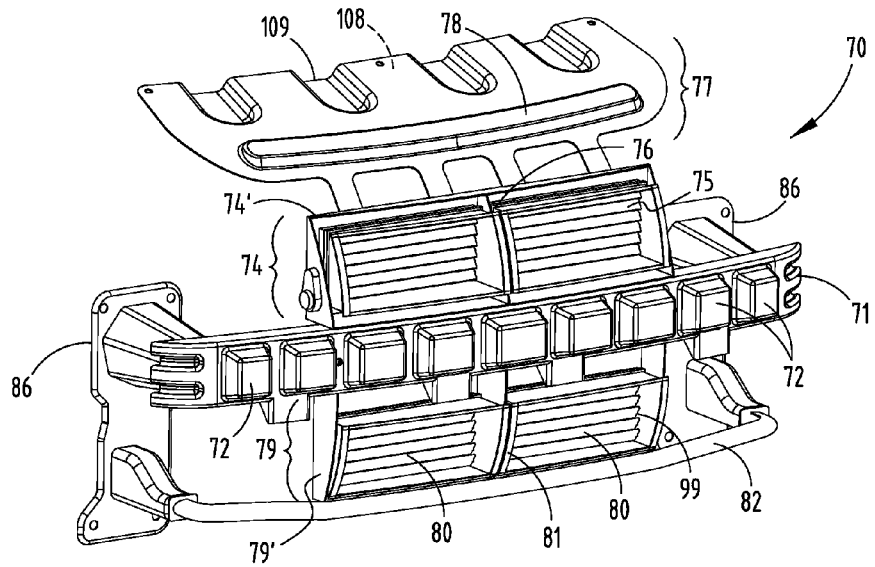
FIGS. 5-6 are perspective assembled and exploded views of a modified integrated assembly not unlike that shown in FIG. 1.
Figure 6:
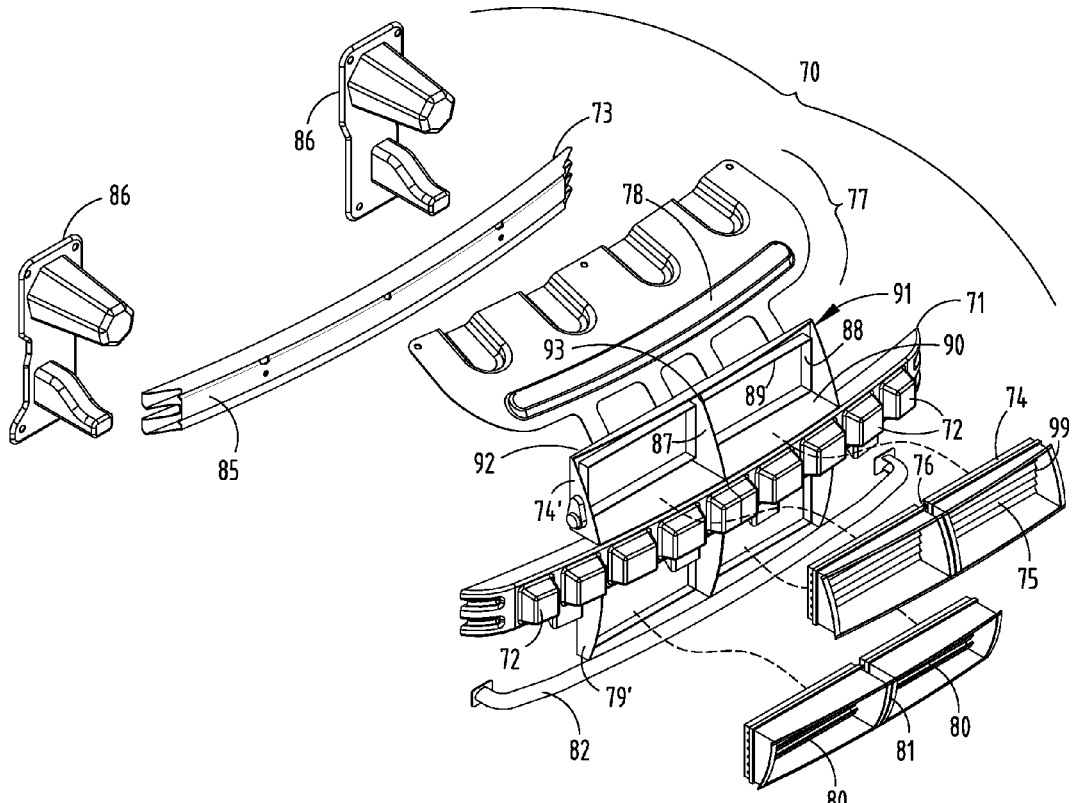
Figure 7:
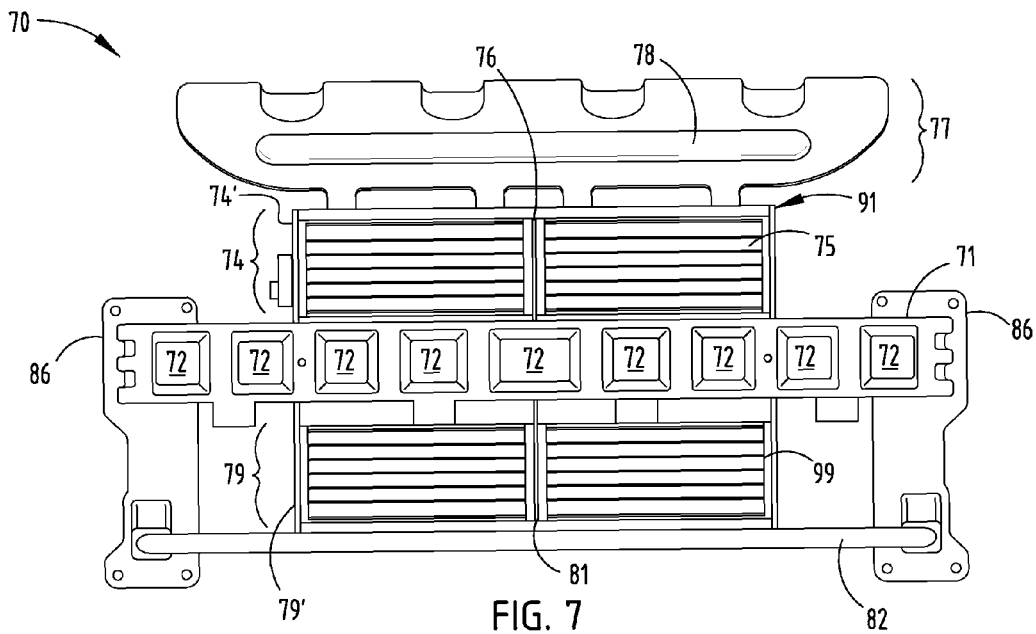
FIG. 7 is a front view of FIG. 5.
Figure 8:
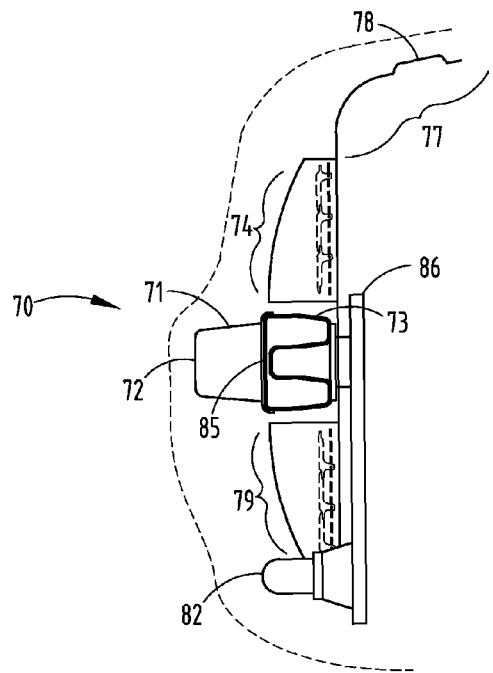
FIG. 8 is a vertical cross section through FIG. 7.
Figure 22:
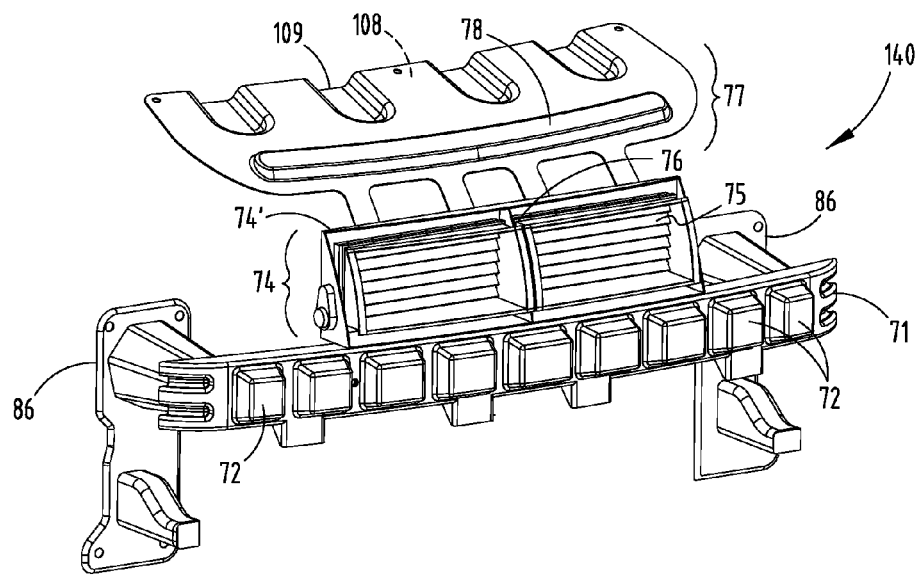
FIGS. 22-23 are perspective views of modified integrated components similar to FIG. 5, FIG. 22 showing a combination component including a primary bumper energy absorber section, an upper shutter section, and an under-hood top-of-bulkhead energy absorbing section, and with FIG. 23 showing a combination component including a primary bumper energy absorber section, a lower shutter section, and a lower secondary reinforcement section for pedestrian leg impact.
Figure 23:
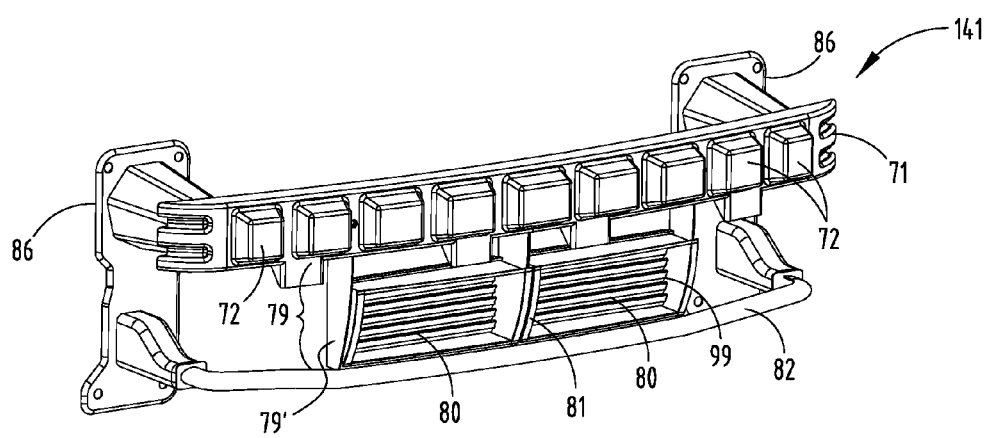

FIGS. 22-23 are perspective views of modified integrated components similar to FIG. 5, but illustrating that the present inventive concepts can be used on alternative designs, such as a combination component 140 (FIG. 22) including a primary bumper energy absorber section, an upper shutter section, and an under-hood top-of-bulkhead energy absorbing section, or a combination component 141 (FIG. 23) including a primary bumper energy absorber section, a lower shutter section, and a lower secondary reinforcement section for pedestrian leg impact.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An assembly for a vehicle including a bumper reinforcement beam, comprising:
    a component including an energy absorbing section and a shutter section, the energy absorbing section including at least one crush section configured to absorb energy when crushed against the bumper reinforcement beam, and the shutter section including active shutter members movable between a closed position to block air flow through the shutter section, an open position to allow air flow through the shutter section, and at least one partially-open position there between for allowing limited air flow;
    wherein the shutter members each include a cross section having a "Y" shape and further have stiffening ribs extending therefrom for increased cross-sectional stiffness, and with a tip of each of the shutter members each being shaped to closely engage a mating surface on an adjacent one of the shutter members to minimize air leakage when the surfaces engage.

2. The assembly defined in claim 1, wherein the component includes a perimeter frame defining an opening, and including a shutter module incorporating the shutter section which fits matably into the opening and that is attached to the perimeter frame, the shutter module including the active shutter members which are movable between a closed position to block air flow through the shutter perimeter frame, an open position to allow air flow through the perimeter frame, and at least one partially-open position there between for allowing limited air flow.

3. The assembly defined in claim 2, wherein the perimeter frame and shutter module include mating features that frictionally engage upon assembly.

4. The assembly defined in claim 3, wherein the mating features snappingly-engage and attach upon assembly.

5. The assembly defined in claim 1, including at least one linkage arm and linkage for selectively moving the shutter members between the different air flow positions, and wherein the actuator mechanism includes an actuator for moving the linkage.

6. A vehicle comprising:
    a vehicle frame;
    a bumper reinforcement beam on a front of the vehicle frame;
    an engine supported on the vehicle frame and located behind the reinforcement beam;
    a component including a shutter section positioned above the reinforcement beam and at least as far forward as a rear surface of the reinforcement beam, the shutter section including active shutter members movable between a closed position to block air flow through the shutter perimeter frame, an open position to allow air flow through the perimeter frame, and at least one partially-open position there between for allowing limited air flow.

a shutter assembly incorporating the component with the shutter section, the shutter members having a cross section with two spaced arms and a stem defining a "Y" shape and further having stiffening ribs extending between the spaced arms for vane stiffness, a tip of one of the arms having a first surface shaped to closely engage a mating surface on the stem to minimize air leakage when the first and mating surfaces engage; and the shutter assembly further having at least one linkage arm and linkage for selectively moving the shutter vane members between the different air flow positions.

7. An integrated assembly for a vehicle comprising:

a unitary molding including a bumper energy absorber section with a plurality of crush lobes configured to abut a face of a primary bumper reinforcement beam, and at least one shutter section with shutter members configured to move between an air-blocking closed position and an air-flow open position; and an actuator mechanism for moving the shutter members between the closed and open positions; and wherein the shutter members are aerodynamically shaped and configured to move toward the open position upon encountering air pressure from the vehicle's movement even if the actuator mechanism fails.

8. The assembly defined in claim 7, wherein the at least one shutter section includes an upper air shutter section attached above the bumper energy absorber section.

9. The assembly defined in claim 7, wherein the at least one shutter section includes a lower air shutter section attached below the bumper energy absorber section.

10. The assembly defined in claim 7, including the bumper reinforcement beam, and wherein the plurality of crush lobes section includes at least one hollow crush lobe with closed end for absorbing energy upon impact against the bumper reinforcement beam.

11. The assembly defined in claim 10, wherein the plurality of crush lobes are spaced uniformly apart across the bumper reinforcement beam.

12. The assembly defined in claim 7, the unitary molding includes a perimeter frame defining an opening, and wherein the at least one shutter section snaps into the perimeter frame as a modular unit.

* * * * *